United States Patent [19]
Lautenschläger

[11] Patent Number: 5,382,414
[45] Date of Patent: Jan. 17, 1995

[54] APPARATUS FOR PERFORMING CHEMICAL AND PHYSICAL PRESSURE REACTIONS

[75] Inventor: Werner Lautenschläger, Leutkirch, Germany

[73] Assignee: MLS Mikrowellen-Labor Systeme GmbH, Leutkirch, Germany

[21] Appl. No.: 835,624

[22] Filed: Feb. 13, 1992

[30] Foreign Application Priority Data

Feb. 19, 1991 [DE] Germany .................... 4105094
May 3, 1991 [DE] Germany .................... 4114525

[51] Int. Cl.6 ................................ B01S 19/12
[52] U.S. Cl. ................................ 422/186; 204/902; 250/432 R
[58] Field of Search ............ 422/186; 250/432 R, 250/433, 435, 436, 437; 204/902

[56] References Cited

U.S. PATENT DOCUMENTS

| | | | |
|---|---|---|---|
| 4,248,831 | 2/1981 | Hughes | 422/102 |
| 4,563,335 | 1/1986 | Akiyama et al. | 422/159 |
| 4,565,670 | 1/1986 | Miyazaki et al. | 422/186.04 |
| 4,576,692 | 3/1986 | Fukuta et al. | 204/165 |
| 4,637,145 | 1/1987 | Sugisawa et al. | 34/1 |
| 4,681,740 | 7/1987 | Commarmot et al. | 422/78 |
| 4,883,570 | 11/1989 | Efthimion et al. | 204/164 |
| 5,023,056 | 6/1991 | Aklufi et al. | 422/186 |
| 5,049,362 | 9/1991 | Baumgarten | 422/186.05 |
| 5,059,400 | 10/1991 | Bénézech et al. | 422/186 |
| 5,114,684 | 5/1992 | Walker et al. | 422/186 |
| 5,204,070 | 4/1993 | Wilson et al. | 422/186 |
| 5,262,125 | 11/1993 | Goodman | 422/23 |

FOREIGN PATENT DOCUMENTS 3818697 12/1989 Germany .

*Primary Examiner*—Donald P. Walsh
*Assistant Examiner*—Daniel Jenkins
*Attorney, Agent, or Firm*—Fitzpatrick, Cella, Harper & Scinto

[57] ABSTRACT

The invention relates to apparatus for performing chemical and physical pressure reactions on samples by the action of microwaves, having container inserts to receive the samples that are at least in part microwave-permeable and are arranged in a microwave-impermeable housing connected via at least one coupling opening to a microwave generator. To enable pressure reactions to be performed at higher pressures and more economically overall, it is proposed according to the invention that the housing include at least one pressure vessel (4) of high-pressure resistant material whose coupling opening (12) is microwave-permeable and closed in a high-pressure resistant manner, and that a single container insert is arranged in the pressure vessel (4) so as to fit closely against its inner surface.

17 Claims, 4 Drawing Sheets

APPARATUS FOR PERFORMING CHEMICAL AND PHYSICAL PRESSURE REACTIONS

TECHNICAL FIELD OF THE INVENTION

The invention relates to apparatus for performing chemical and physical pressure reactions on samples by the action microwaves, comprising container inserts to receive the samples that are at least partially microwave permeable and are arranged in a microwave-impermeable housing means connected to a microwave generator via at least one coupling opening.

BACKGROUND OF THE INVENTION AND PRIOR ART

It is known from DE-OS 38 18 697 to use for chemical and physical pressure reactions conventional microwave ovens and pressure resistant container inserts which serve to receive the samples and are inserted singly or several at a time in the heating chamber defined by the housing of the respective microwave oven. The microwaves emitted by the microwave generator of the microwave oven into its heating chamber when in operation penetrate the microwave-permeable plastics container wall and heat up the sample in the container, with a corresponding increase in pressure. Since the container inserts consist of plastics material they may be used without suffering damage only up to pressures of up to 200 bar. Higher pressures are however desired, for example for extractions, to increase the boiling point of the solvent so as to perform the extraction at correspondingly higher temperatures and thus more quickly, i.e. more economically. While pressure resistant container inserts of metallic material withstand higher pressures, they are not suitable for use in microwave ovens because of their property of reflecting microwaves.

OBJECT OF THE INVENTION

It is an object of the invention to further develop apparatus of the kind mentioned in the introduction so that reactions can be carried out under higher pressure conditions and more economically overall.

SUMMARY OF THE INVENTION

This object is achieved by the provision of a housing which includes at least one pressure vessel of a pressure resistant material whose coupling opening is microwave-permeable and is sealed in a pressure resistant manner, and by the provision of a single container insert which is arranged in the pressure vessel and which fits closely against its inner surface. In this way the reaction pressure prevailing in the interior of the container insert used is not, as before, taken up by the container insert itself but by the pressure vessel. This vessel is impermeable to microwaves and can therefore consist, for example, of metallic material that is considerably stronger than the material of the container inserts, which are still necessarily microwave-permeable. Non-metallic high-pressure resistant materials may also be used as long as they are impermeable to microwaves, i.e. are electrically and/or magnetically conductive. Microwave-permeable material is only necessary to close the coupling opening, whose comparatively small dimensions compensate for the lower strength of this material so that with the apparatus according to the invention pressure reactions can be carried out in the region of 1000 bar and above.

The container insert may be formed as a receptacle that serves to close the coupling opening, and for this purpose is permeable to microwaves and high-pressure resistant at least in this region. It is preferably formed as a two-part receptacle that comprises a microwave-permeable sample container to receive the samples and a closure element that serves both to receive this container and to close the coupling opening, for which purpose it is microwave-permeable and high-pressure resistant at least in this region.

According to a further embodiment the container insert is formed as a through-flow reactor insert that can be connected to an inlet and an outlet connection of the pressure vessel. This insert is advantageously made in two parts, comprising a closure element for closing the coupling opening that is microwave-permeable and high-pressure resistant at least in this region, and a high-pressure resistant core element arranged in the closure element and having an external screw thread that can be connected at its two ends to the inlet and outlet connections respectively. The core element may be microwave-permeable and/or microwave-absorbant. In the latter case the sample is heated both directly by the microwave radiation passing through the closure element and indirectly by the core element that has been heated by the absorbed radiation. To achieve the same effect the sample container may also consist of a microwave-absorbant material.

According to a further development of the invention the core element can be inserted loosely in the closure element and the latter can be inserted loosely in the pressure vessel and can thermally expand under the influence of the reaction temperature until it fits closely against the inner surface of the closure element or of the pressure vessel.

Advantageously the sample container can also be inserted loosely into the closure element and can deform or thermally expand under the influence of the reaction pressure and/or the reaction temperature until it fits closely against the inner surface of the closure element and, should its height be greater than that of the closure element, against the inner surface of the pressure vessel. Suitably the sample container is elastically deformable and may consist of a fluoropolymer or fluorocopolymer that is at the same time microwave-permeable.

The pressure vessel preferably has a circular cylindrical cross-section so that it can also withstand very high pressures. For reactions in which the samples are arranged in the lower part of the pressure vessel it is advantageous to make the coupling opening in the cylinder wall near the base of the pressure vessel. To obtain the highest possible temperatures of the sample it is advantageous to form the sample container so that it has its greatest wall thickness in its wall region associated with the coupling opening or the closure element. In the region above the coupling opening in which the sample container has a smaller, preferably its smallest, wall thickness a cooling means can be provided on the pressure vessel in order, for example when extracting samples by means of a container insert in the form of a Soxhlet apparatus, to bring about the most effective cooling of the vaporized solvent in the upper region of the pressure vessel.

The closure element preferably consists of plastics or ceramic material; its shape is preferably that of a tube.

According to a further development of the invention the pressure vessel is formed as a resonator in order to achieve a high microwave density and intensity in the interior of the pressure vessel and thus high efficiency.

The dimensions of the pressure vessel are preferably variable. By this means the microwave density and/or microwave frequency, the field strengths and the field and/or amplitude distributions (H and E waves) can be adapted to the reaction to be carried out at the time.

The pressure vessel may be connected detachably to the microwave generator or to a conductor leading thereto. Equally, the conductor may be connected detachably to the microwave generator.

An advantageous way of changing the dimensions of the pressure vessel is to provide several interchangeable inserts of different sizes to be inserted singly in the pressure vessel. These inserts may be in the form of lengths of tubing having different wall thicknesses. The correspondingly shaped closure element may be used as the insert: in this case the element is only microwave-permeable in the region of the coupling opening but is otherwise microwave-impermeable.

The inserts may also be in the form of base plates which differ at least in their thickness. It is also possible to provide a base plate arranged to be vertically adjustable in the pressure vessel by means of a lifting device.

BRIEF DESCRIPTION OF THE DRAWINGS

The invention will now be described in more detail with reference to some preferred exemplary embodiments and forms shown in the drawings, in which.

DETAILED DESCRIPTION OF PREFERRED EMBODIMENTS OF THE INVENTION

Figure 2:
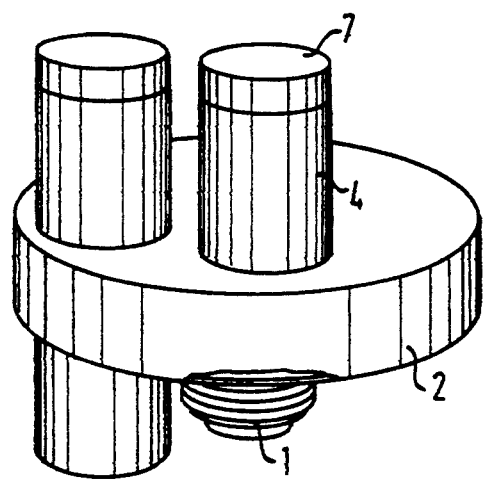
FIG. 2 shows a second form of the apparatus according to the invention in a perspective diagrammatic view.

In all the exemplary embodiments the apparatus according to the invention comprises a microwave generator in the form of a magnetron 1 of conventional design with a decoupling device 2 which has a flat circular cylindrical shape and several radially extending waveguides 3, and a number of pressure vessels 4 which are connected detachably to the waveguides 3. The decoupling device 2 serves at the same time as a central supporting element for the magnetron 1 attached to its underside and for the pressure vessels 4. Instead of the waveguides 3 coaxial cables (not shown) may be used; in this case the pressure vessels 4 are attached directly to the decoupling device 2 as shown in FIG. 2, but for a direct connection they are attached without conductors to the magnetron 1 as shown in section in FIG. 6.

Figure 3:
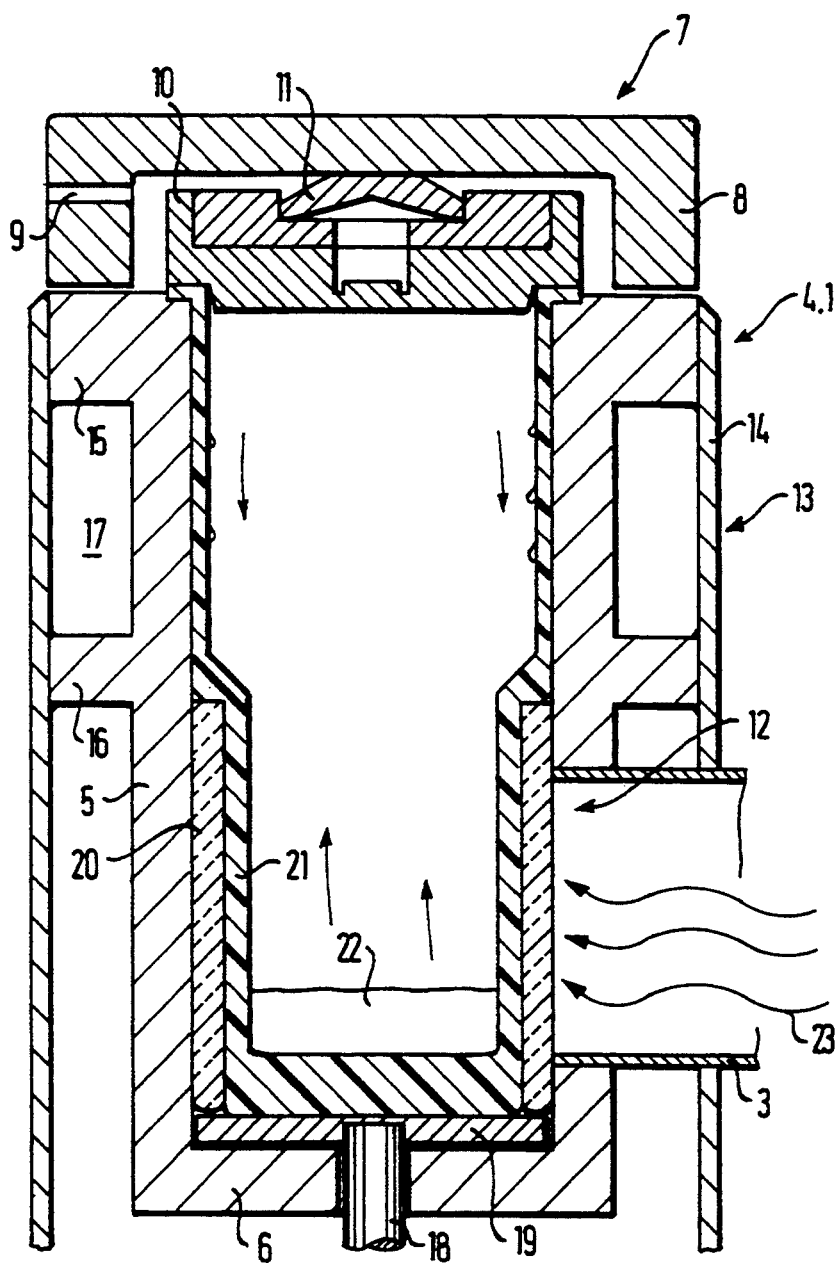
FIG. 3 is a sectional view of a pressure vessel shown in FIG. 1 according to a first exemplary embodiment.

The pressure vessel shown in FIG. 3 with the reference numeral 4.1 has a circular cylindrical cross-section, consists of a high-pressure resistant metallic material, such as stainless steel or aluminium, and includes a cylinder wall 5 which, at its bottom end, is closed by a bottom wall 6 and at its top end has a charging opening that can be sealed pressure-tight by closure means 7. The closure means 7 includes a bayonet closure outer cover 8 having a venting bore 9 and an inner cover 10 which, when the outer cover 8 is closed, is pressed against the upper free edge of the cylinder wall 5 by a tension spring arrangement 11 supported thereon. In the lower region in the vicinity of the bottom wall 6 a coupling opening 12 is formed in the cylinder wall 5 to which the waveguide 3 is connected. On the pressure vessel 4.1, above the coupling opening 12, there is a cooling means 13 including a sleeve 14 that has a larger diameter than the cylinder wall 5 and is attached to respective top and bottom flanges 15 and 16 projecting from the cylinder wall 5, for example by welding. The chamber 17 defined by these flanges 15, 16 and the sleeve 14 is connected in a manner not shown, for example by means of a quick-release coupling, to a line (likewise not shown) leading to a cooling fluid supply (water) and a cooling device, for example a bulb condenser. Attached to the upper free end of a piston rod 18 of a lifting device (not shown), such as a pneumatic cylinder, passing through a central opening in the bottom wall 6 there is a base plate 19 which can be displaced and secured at any desired height in the pressure vessel 4.1 by actuating the lifting device. The sleeve 14 extends from the bottom flange projection beyond the bottom wall 6 downwards thereby forming a kind of housing in which the lifting device is enclosed.

The pressure vessel 4.1 is formed as a resonator, i.e. the diameter and height of its hollow interior are selected and adapted to the waveguide dimensions and to the frequency range of the microwaves generated by the magnetron 1 so as to obtain the field strengths desired for the reaction to be carried out at the time and the field and/or amplitude distributions (H and E waves) that are aimed at. By securing the piston rod 18 and thus the base plate 19 at the corresponding stroke height within the pressure vessel 4.1 the height of the hollow interior can be adjusted and thus the resonator can be tuned. Optionally the waveguide 3 may be exchanged for a waveguide having different dimensions and/or microwave radiation of a different frequency may be coupled thereto. If there is no lifting device one of several base plates of different thicknesses can be arranged exchangeably in the pressure vessel 4.1 instead of the base plate 19.

A container insert in the form of a two-part receptacle comprising a closure element 20 within which a removable sample container 21 to receive a sample 22 is arranged removably in the pressure vessel 4.1. The closure element 20 is in the form of a length of tube and consists of microwave-permeable and high-pressure resistant material, such as a suitable plastics or ceramic material, and serves to close the coupling opening 12 in a pressure-tight manner. Correspondingly it extends with the required overlap only in the region of this coupling opening 12.

The sample container 21 consists of an elastically deformable, microwave-permeable plastics material, preferably PTFE, and has its greatest wall thickness in the region of the closure element 20 and its smallest wall thickness in the region of the cooling means 13. The height of the sample container is slightly greater than that of the cylinder wall 5 of the pressure vessel 4.1.

The sample container 21 can be inserted loosely into the closure element 20 and together with it can be inserted through the charging opening loosely into the pressure vessel 4.1. The dimensions and the materials of the receptacle used are selected so that the closure element 20 can thermally expand under the influence of the reaction temperature until it fits closely against the inner surface 5 of the pressure vessel 4.1 and so that the sample container 21 can deform elastically and thermally expand under the influence of the reaction pressure and the reaction temperature until it fits closely against the inner surface of the cylinder wall 5 and the closure element 20.

By using several closure elements that are microwave-permeable only in the region of the coupling opening but otherwise microwave-impermeable due, e.g., to a metallic layer on their inside surface and have different wall thicknesses and possibly different heights, it is always possible to insert the right closure element 20 into the pressure vessel 4.1 to adapt its cavity diameter and thus its resonator properties to match the reaction to be carried out.

The pressure vessel 4.1 described above is intended to perform, for example, pressure decompositions. For this purpose, after moving the base plate 19 by means of the lifting device into a raised charging position, the closure element 20, possibly one having the wall thickness necessary to adapt the resonator properties of the pressure vessel 4.1 to the pressure decomposition to be performed, is inserted into the pressure vessel 4.1 and then the sample container 21 charged with the sample 22 is inserted into the closure element 20 and the pressure vessel 4.1. The base plate 19 and thus the receptacle 20, 21 is then lowered into the working position (in the present exemplary embodiment into the position shown in FIG. 3) which corresponds to the height necessary to adapt the resonator properties of the pressure vessel 4.1 to the pressure decomposition to be carried out. Finally the pressure vessel 4.1 is closed in known manner by means of the closure means 7. The part of the sample container 21 projecting beyond the cylinder wall 5 and bent outwardly over its free end serves as a seal.

After switching on the magnetron the microwaves 23 generated thereby are coupled by the waveguides 3 and the coupling opening 12 into the pressure vessel 4.1 in order, after passage through the closure element 20 and the sample container 21, to heat the sample 22 and the air in the interior of the pressure vessel 4.1 with the oxygen necessary for the decomposition with increase in pressure. The high microwave density in the interior of the pressure vessel 4.1 provides for rapid increase in temperature and pressure up to very high levels. The increase in temperature is responsible for the closure element expanding and thereby fitting closely against the inner surface of the cylinder wall 5 of the pressure vessel 4.1 to provide a pressure seal. The same applies to the sample container 21, which however mainly deforms elastically due to the increase in pressure and thus fits closely against the inner surface of the cylinder wall 5. In this way the pressure in the interior of the sample container 21 is taken up by the pressure vessel 4.1.

Under the reaction conditions described above atmospheric oxygen reacts through the breaking and reformation of bonds to form free radicals which combine with the sample so that it is oxidized, i.e. decomposed. Gaseous products formed condense on the inner surface of the cylinder wall 5 associated with the cooling means 13 and are returned to the reaction. After the completion of the decomposition and suitable cooling the pressure vessel 4.1 is opened by removing the closure means 7 and the receptacle 20, 21 is moved into the charging position by raising the base plate 19 in order to be removed. The reaction products of the decomposition can then be separated from one another by a subsequent physical separating process.

Figure 4:
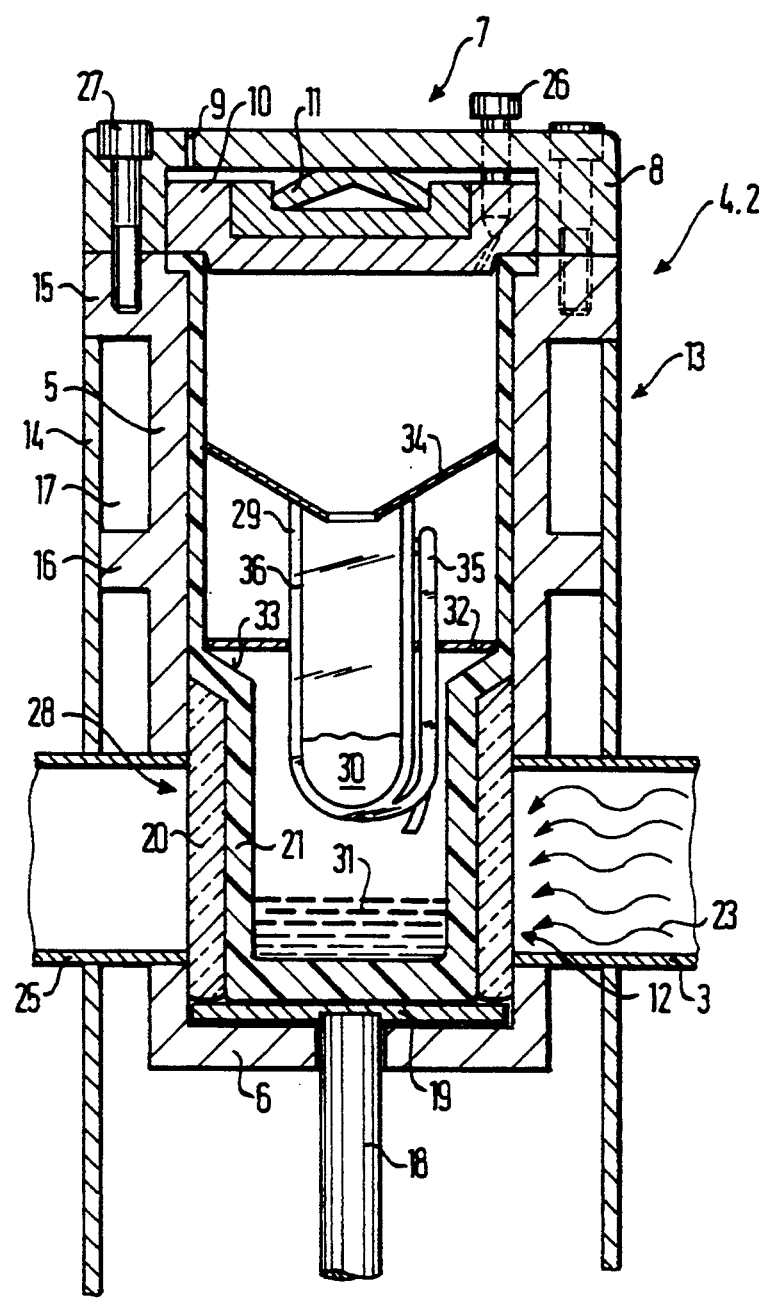
FIG. 4 is a sectional view of a pressure vessel shown in FIG. 1 according to a second exemplary embodiment.

The pressure vessel shown in FIG. 4 with the reference numeral 4.1 substantially corresponds to that shown in FIG. 3 and only differs in that it has a connection 25 for a temperature sensor (not shown) and a connection 26 for a pressure sensor (likewise not shown) and that the bayonet closure outer cover 8 can in addition be affixed to the cylinder wall 5 by means of screws 27. The connection 25 for the temperature sensor leads, via an opening 28 in the cylinder wall 5 opposite the coupling opening 12 that, like the latter, is sealed by the closure element 20, into the pressure vessel 4.2. The connection 26 for the pressure sensor is made in the closure means 7.

The pressure vessel 24 is intended for carrying out extractions by means of a Soxhlet apparatus.

This comprises the cooling means 13 and an extractor which consists of a cylindrical glass insert 29 to receive a sample 30 to be extracted and of the bottom part of the sample container 20 to receive a solvent 31. The glass insert 29 is provided about half way up with a ring flange 32 which has through-bores (not shown) and is supported against the circumferential step 33 formed by the free upper edge of the closure element 20. Adjoining the upper free edge of the glass insert 29 is an upwardly diverging funnel 34 which likewise has through-bores (not shown) and which extends to fit closely against the sample container 21. An overflow tube 35 connected to the glass insert 29 in its upper region extends through the ring flange 32 into the upper region of the bottom part of the sample container 21 accommodating the solvent 31. A so-called frit 36 of PTFE is removably arranged in known manner in the glass insert 29.

After inserting the receptacle 20, 21 containing the solvent 31 into the pressure vessel 4.2 in the manner described above the frit 36 containing the sample 30 to be extracted is pressed into the glass insert 29, which is then put into the receptacle 20, 21 so that its ring flange is supported on the step 33 and the funnel fits closely against the sample container 21. The pressure vessel 4.2 is then closed by means of the closure means 7 in the manner likewise already described and the connection 26 for the pressure sensor is connected to a line (not shown) which leads to a control device (not shown) of the magnetron 1. The connection 25 for the temperature sensor is connected to this control device in a manner also not shown.

After the magnetron 1 has been switched on the microwaves 23 emitted therefrom reach the solvent 31 in the manner already described in order to heat it up. If the solvent is a non-polar solvent the sample container 21 can consist of a microwave-absorbing material which gives off the heat generated in it by the absorbed microwaves 23 to the solvent, which begins to boil with increase in pressure.

The solvent vapour evolved rises and passes through the through-bores in the ring flange 32 and in the funnel 34, condenses on the inner surface of the sample container 21 above the funnel 34 that has been cooled by the cooling means 13 and drips through the funnel into the glass insert 29. Here it dissolves the substance to be extracted from the sample 30, and on rising above the level of the overflow tube automatically flows back into the bottom part of the sample container 21 via the overflow tube in order to vaporize again. Since this cycle is automatically repeated and only pure solvent vaporizes continuous enrichment of the dissolved substance in the bottom part of the sample container 21 occurs. By means of the pressure sensor (not shown) and the temperature sensor (likewise not shown) the pressure and temperature in the pressure vessel 4.2 are constantly monitored, and if a maximum permissible value is exceeded the power of the magnetron 1 is correspondingly reduced. After the extraction is completed concentration can be performed in a vacuum.

Figure 5:
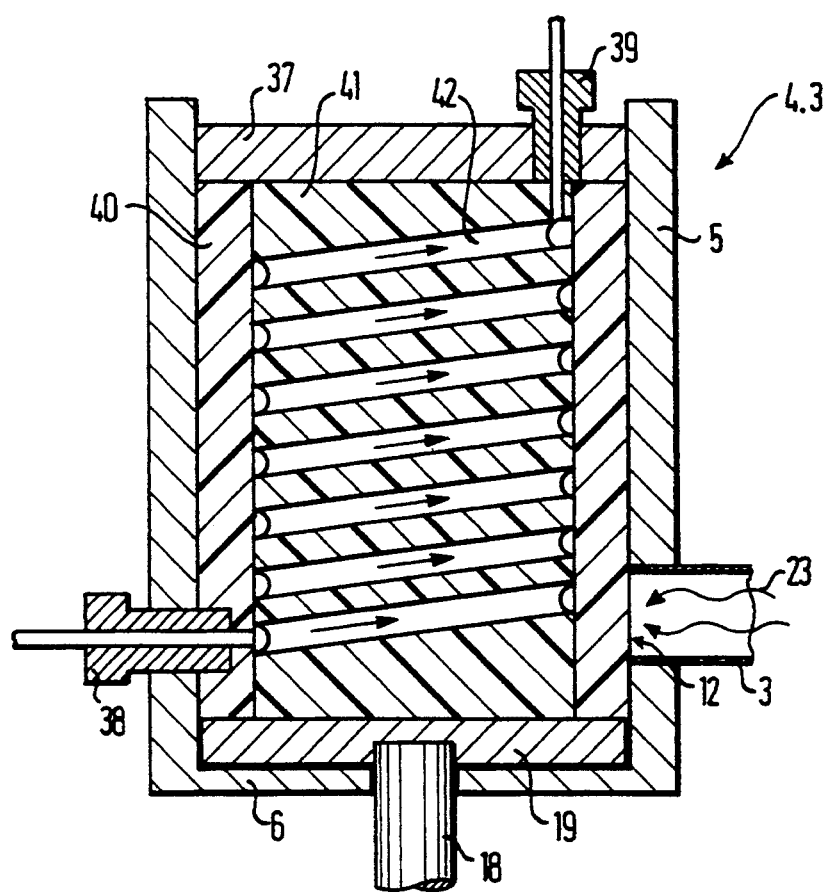
FIG. 5 is a simplified sectional view of a pressure vessel shown in FIG. 1 according to a third exemplary embodiment.

The pressure vessel shown in simplified form in FIG. 5 with the reference numeral 4.3 is of the same shape and of the same material as the pressure vessels in FIGS. 3 and 4 and is likewise formed as a resonator. It likewise comprises the cylinder wall 5, the bottom wall 6, the base plate 19 with the piston rod 18 of the lifting device (not shown), the coupling opening 12 connected to the waveguide 3 and a cover 37 that, in operation, is pressed against the free upper edge of the container insert, which is in the form of a through-flow reactor insert, by a tensioning device shown in FIG. 6. In the lower region of the cylinder wall 5 near the bottom wall 6 opposite the coupling opening 12 there is an inlet connection 38 for the sample to be subjected to the through-flow reaction. The corresponding outlet connection 39 is located in the cover 37.

The through-flow reactor insert includes a tubular closure element 40 and a core element 41 arranged therein, both of which consist of microwave-permeable, high-pressure resistant plastics or ceramic material and which extend over the entire height of the interior of the pressure vessel. The core element 41 is provided with an external screw thread 42, the two ends of which terminate at the inlet and outlet connections 38, 39 when the through-flow reactor insert 40, 41 is placed in the pressure vessel 4.3 (see FIG. 5). The closure element 40 thus serves not only to seal the coupling opening 12 in a pressure-tight manner but, in cooperation with the screw thread 42 of the core element 41, also defines a flow passage.

The through-flow reactor insert can be inserted loosely into the pressure vessel 4.3 in the same manner as the receptacles shown in FIGS. 3 and 4, and under the influence of the reaction temperature fits closely against the inner surface of the cylinder wall 5. By the same effect the core element 41 is held closely against the inner surface of the closure element 40 during the reaction. The pressure which arises during a through-flow reaction, i.e. as the liquid sample is caused to flow through the flow passage formed by the screw thread 42, is not taken up by the through-flow reactor insert but by the pressure vessel 4.3.

Figure 1:
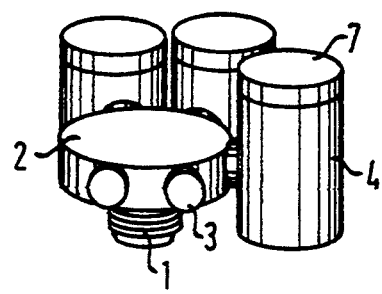
FIG. 1 shows a first form of the apparatus according to the invention in a perspective diagrammatic view.
Figure 6:
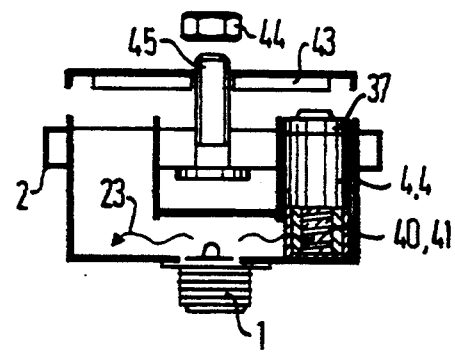
FIG. 6 is a sectional view of the apparatus shown in FIG. 2 having a modified closure means and pressure vessels according to a fourth exemplary embodiment.

The device according to the invention shown in FIG. 6 differs from that shown in FIG. 1 in having no waveguide and being intended to accommodate pressure vessels 4.4 which are substantially identical to the pressure vessels shown in FIG. 5 but do not have a moveable base plate and thus have no lifting device. The pressure vessels 4.4 are connected directly to the magnetron 1. The tensioning device already mentioned in the description of FIG. 5 includes a tensioning cover 43 that can be pressed against all the covers 37 by screwing a nut 44 on to a centrally arranged cap screw 45 anchored to the decoupling device 2.

What is claimed is:

1. Apparatus for performing chemical and physical pressure reactions on a sample or samples by the action of microwaves, comprising a container insert or inserts to receive to receive the sample or samples that is or are at least partially microwave-permeable and is or are arranged in a microwave-impermeable housing means, connected via at least one coupling opening to a microwave generator, characterized in that the housing means comprises at least one pressure vessel of microwave-impermeable material which is formed with said at least one coupling opening; and a microwave-permeable, pressure tight container insert positioned within said pressure vessel, said container insert being of a microwave-permeable, pressure-resistant material, said container insert being pressure sealed with a lid which is pressed against a wall of the insert, said container insert extending over said coupling opening.

2. Apparatus according to claim 1, wherein said container insert is formed as a receptacle that serves to close the coupling opening and for this purpose is microwave-permeable and pressure resistant at least in this region.

3. Apparatus according to claim 1, wherein the container insert is formed as a two-part receptacle comprising an at least partially microwave-permeable sample container to receive the samples and a closure element that serves to receive said sample container and to close the coupling opening, for which purpose it is microwave-permeable and pressure resistant at least in this region.

4. Apparatus according to claim 1, wherein said container insert is formed as a through-flow reactor insert that can be connected to an inlet and an outlet connection of the pressure vessel.

5. Apparatus according to claim 4, wherein said through-flow reactor insert is made in two parts, comprising a closure element for closing the coupling opening that is microwave-permeable and high-pressure resistant at least in this region, and a pressure resistant core element arranged in said closure element and having an external screw thread that can be connected at its two ends to the inlet and outlet connections respectively.

6. Apparatus according to claim 3, wherein said sample container can be inserted loosely into said closure element and the latter can be inserted loosely into the pressure vessels and that said sample container and said closure element fit respectively against the inner surface of the closure element and the inner surface of the pressure vessel under the influence of the reaction conditions.

7. Apparatus according to claim 5, wherein said core element can be inserted loosely into said closure element and the latter can be inserted loosely into the pressure vessels and that said core element and said closure element fit respectively against the inner surface of said closure element and the inner surface of the pressure vessel under the influence of the reaction conditions.

8. Apparatus according to claim 3, wherein said sample container is greater in height than and projects beyond said closure element, so that the projecting part fits against the inner surface of the pressure vessel under the influence of the reaction conditions.

9. Apparatus according to claim 3, wherein said sample container is elastically deformable.

10. Apparatus according to claim 3, wherein the wall of said sample container is thickest in the region associated with the coupling opening and the closure element.

11. Apparatus according to claim 1, wherein said pressure vessel has cooling means in the region above the coupling opening.

12. Apparatus according to claim 1, wherein said pressure vessel is formed as a resonator.

13. Apparatus according to claim 1, wherein the dimensions of said pressure vessel can be changed.

14. Apparatus according to claim 1, that includes a plurality of interchangeable inserts of different dimensions arranged to be inserted singly in said pressure vessel.

15. Apparatus according to claim 14, wherein said closure element is at the same time formed as an insert.

16. Apparatus according to claim 14, wherein the inserts are formed as base plates which differ at least in their thicknesses.

17. Apparatus according to claim 13, wherein a base plate that is vertically adjustable by means of a lifting device is arranged in said pressure vessel.

* * * * *